E. F. HATHAWAY & C. LEA.
MECHANISM FOR HANDLING TUFT YARNS FOR CARPET LOOMS.
APPLICATION FILED APR. 24, 1909.
1,153,865.
Patented Sept. 14, 1915.
7 SHEETS—SHEET 1.
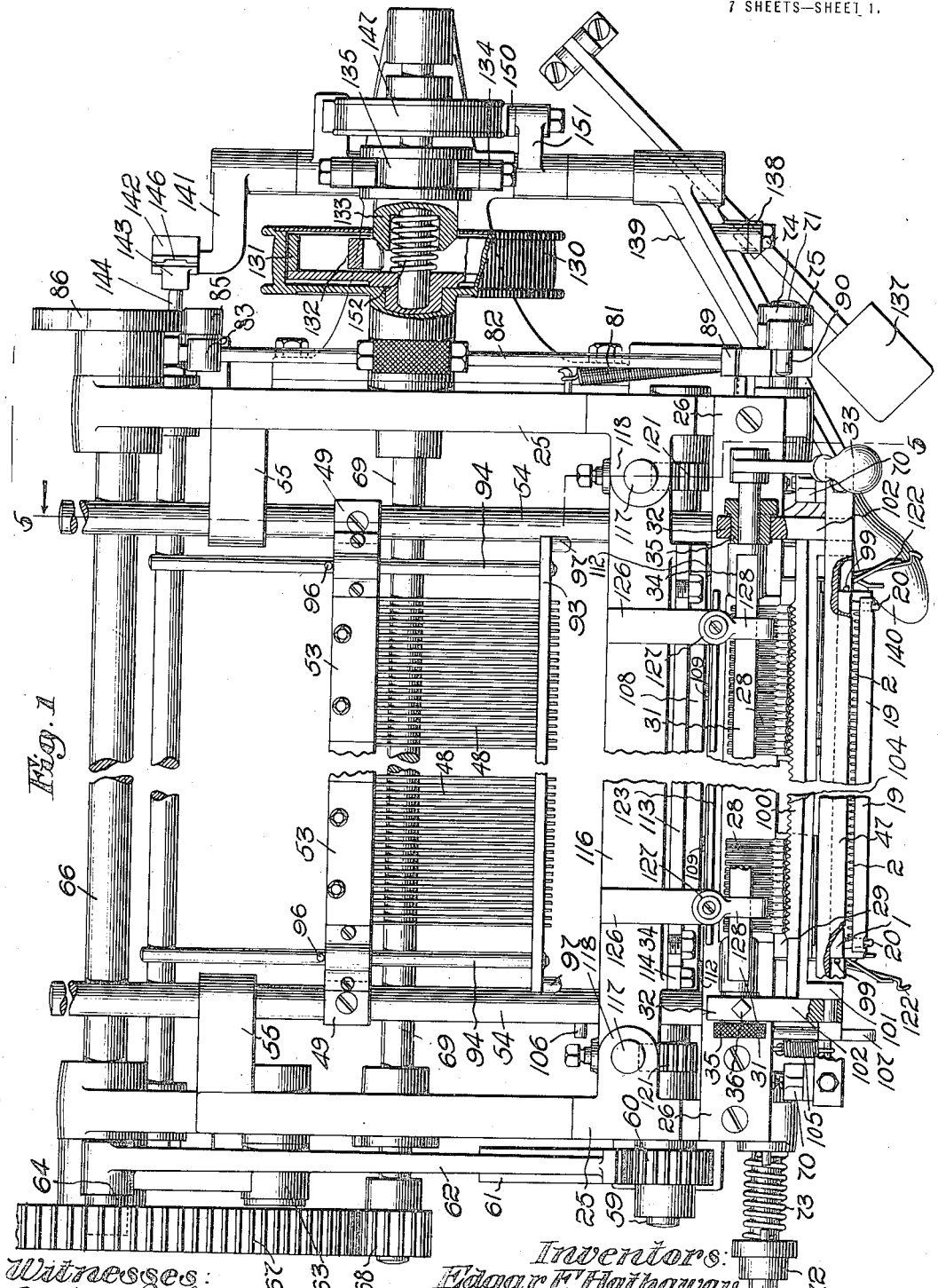
Witnesses:
Edwin T. Luce
Horace H. Crossman
Inventors:
Edgar F. Hathaway
Charles Lea
by Emery Booth
Attys.

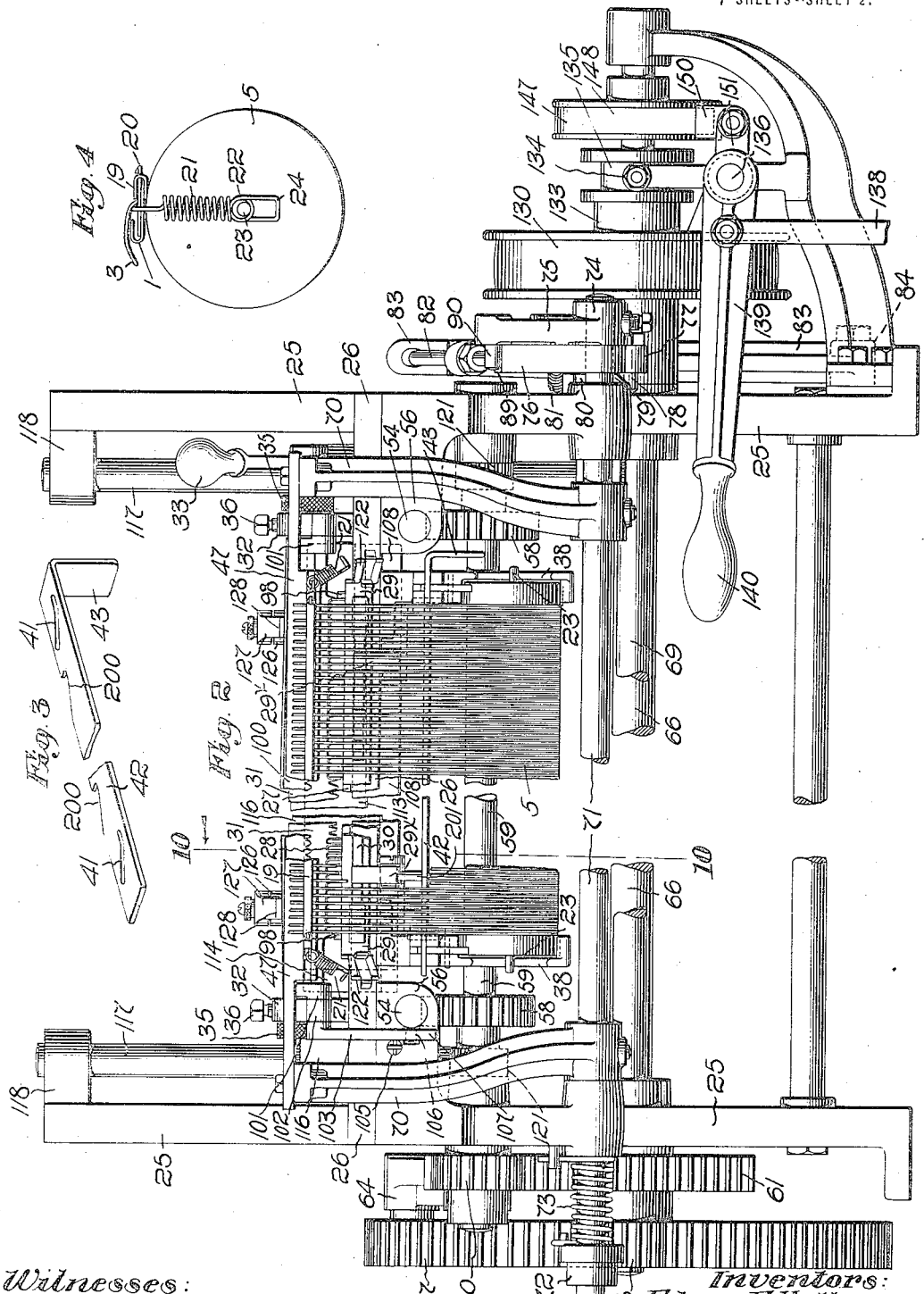

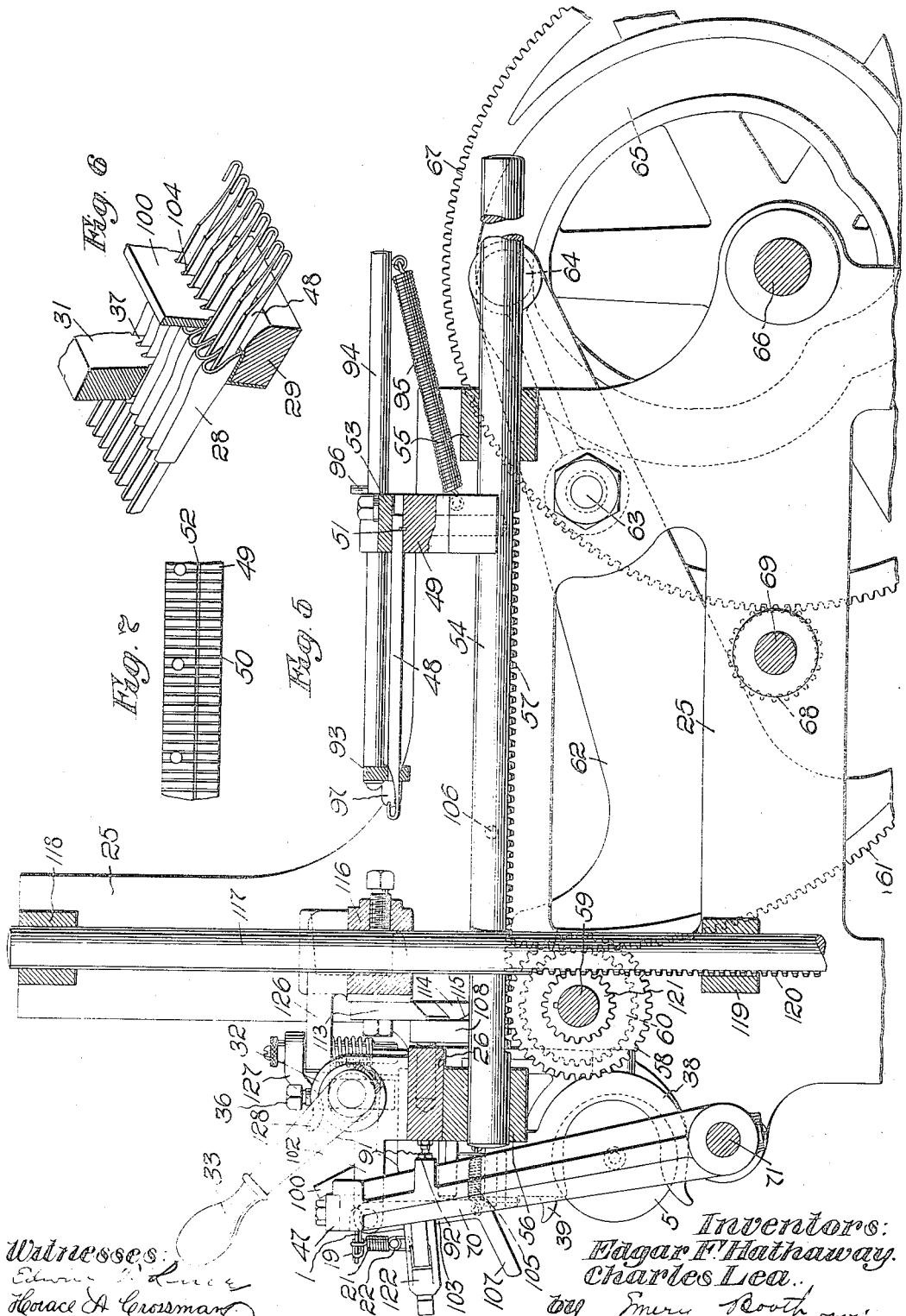

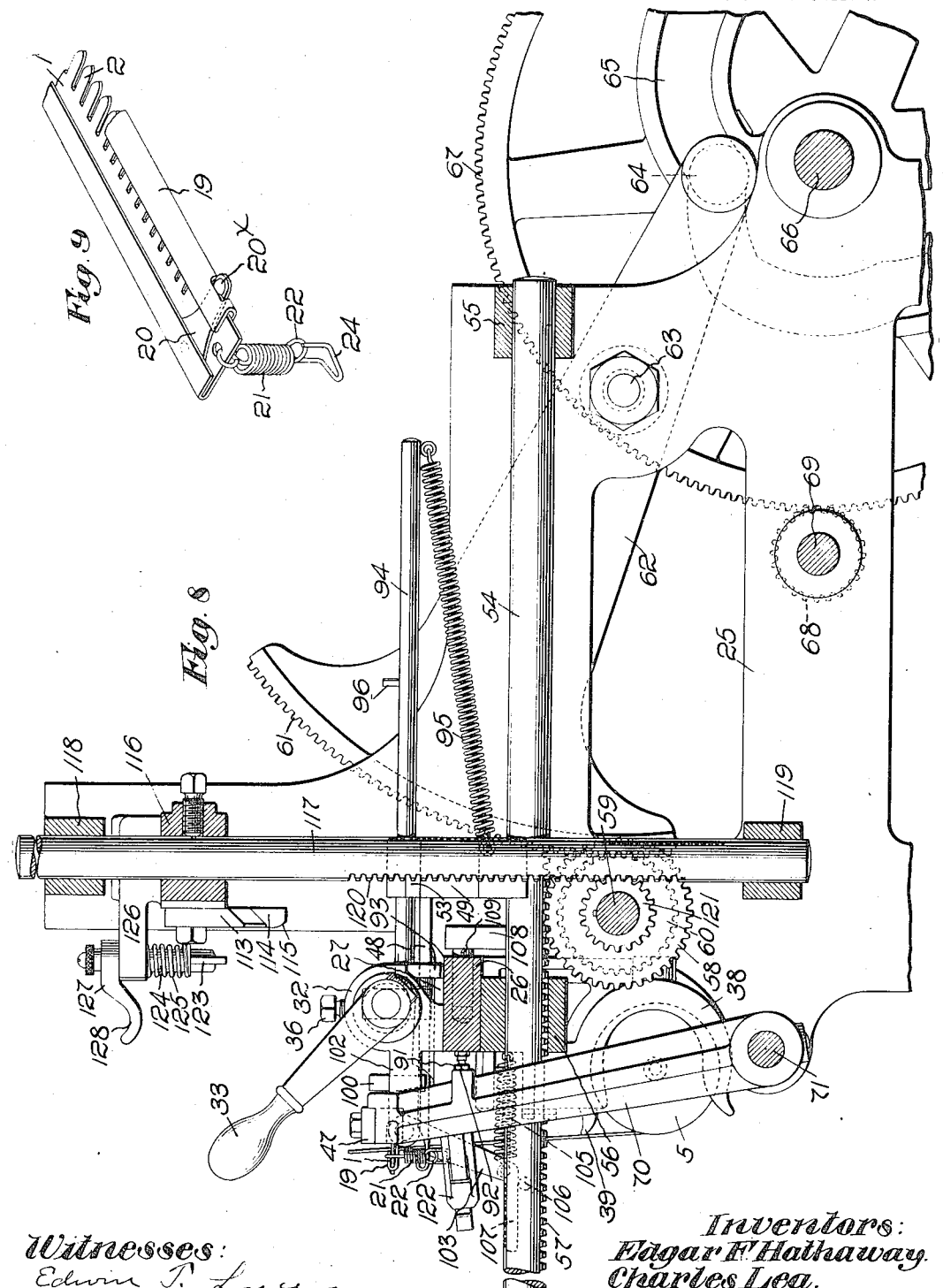

E. F. HATHAWAY & C. LEA.
MECHANISM FOR HANDLING TUFT YARNS FOR CARPET LOOMS.
APPLICATION FILED APR. 24, 1909.
1,153,865.
Patented Sept. 14, 1915.
7 SHEETS—SHEET 5.
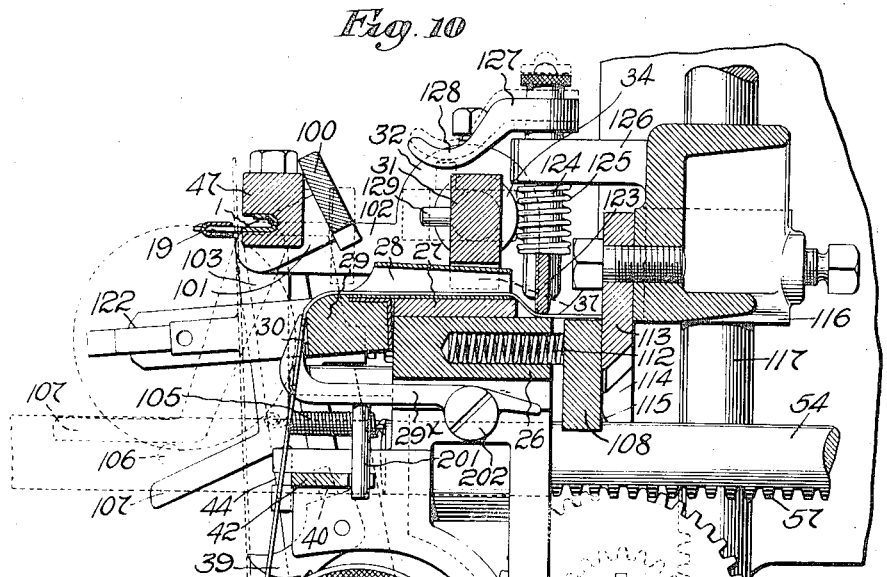
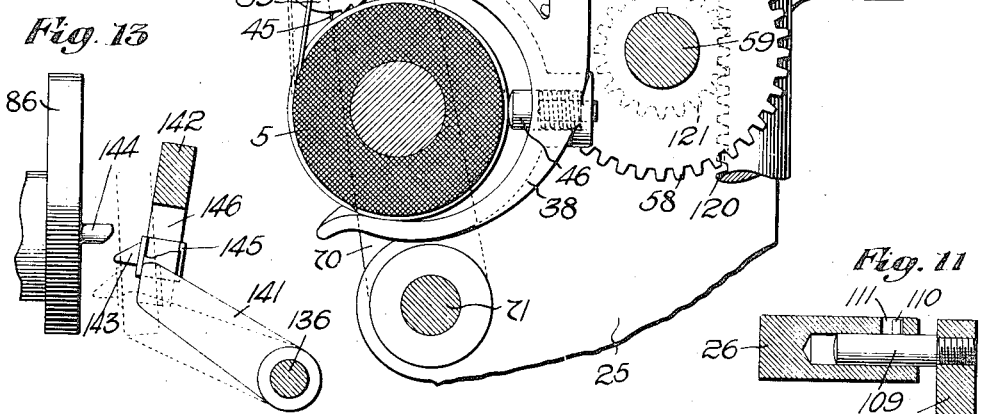
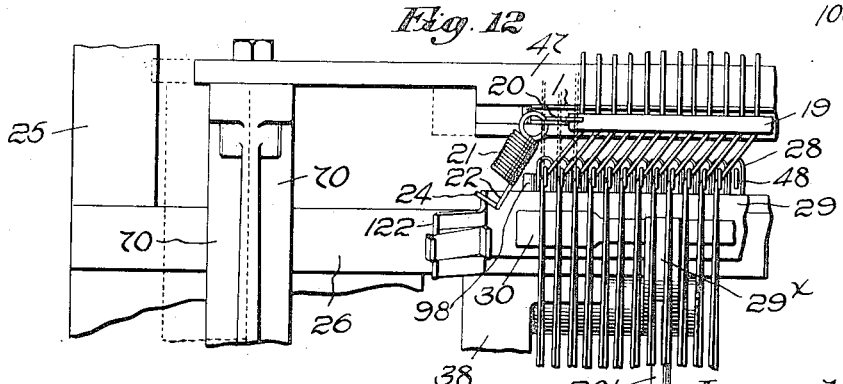
Witnesses:
Edwin T. Luer
Horace A. Crossman
Inventors:
Edgar F. Hathaway,
Charles Lea.
by Emery Booth Attys

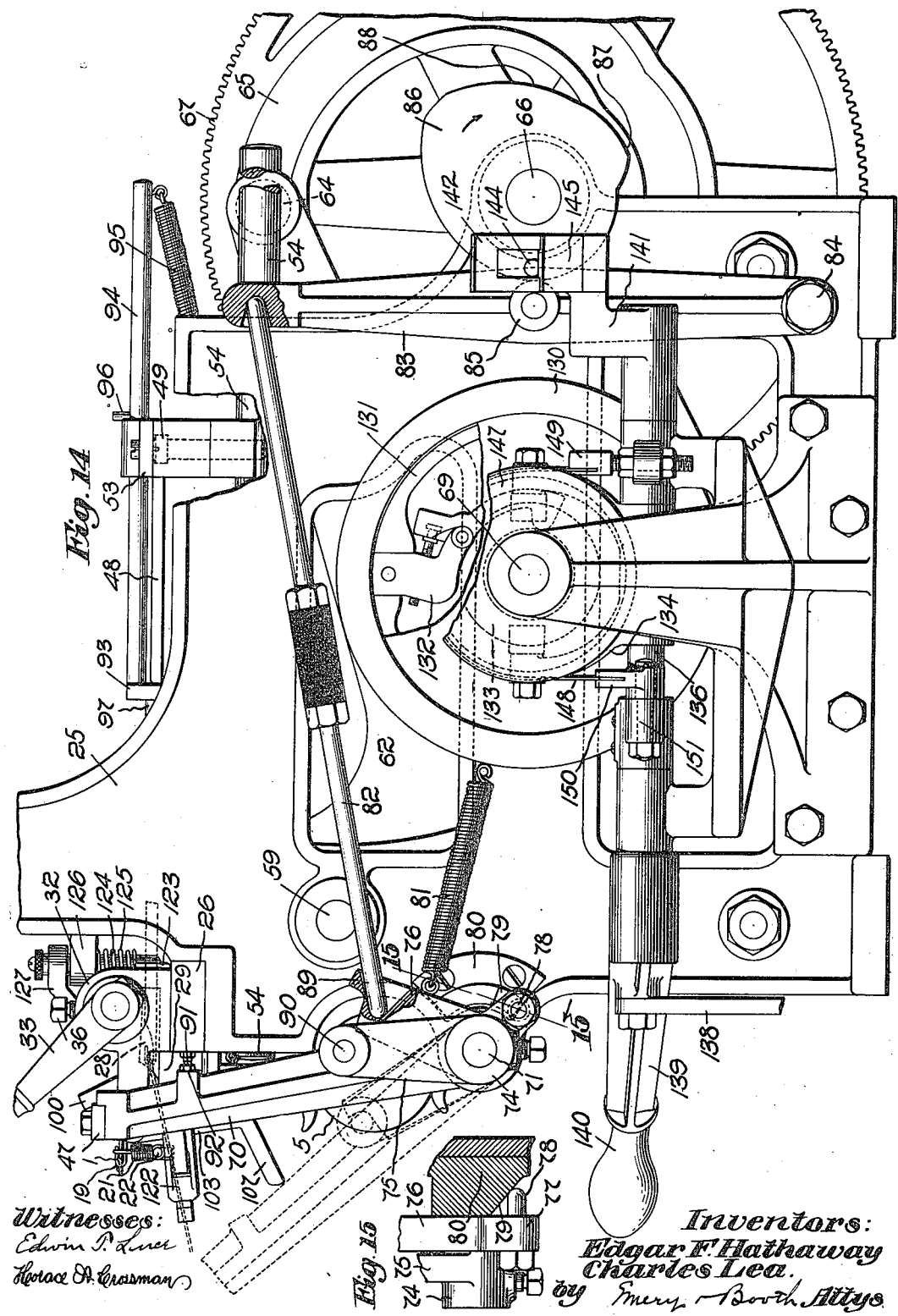

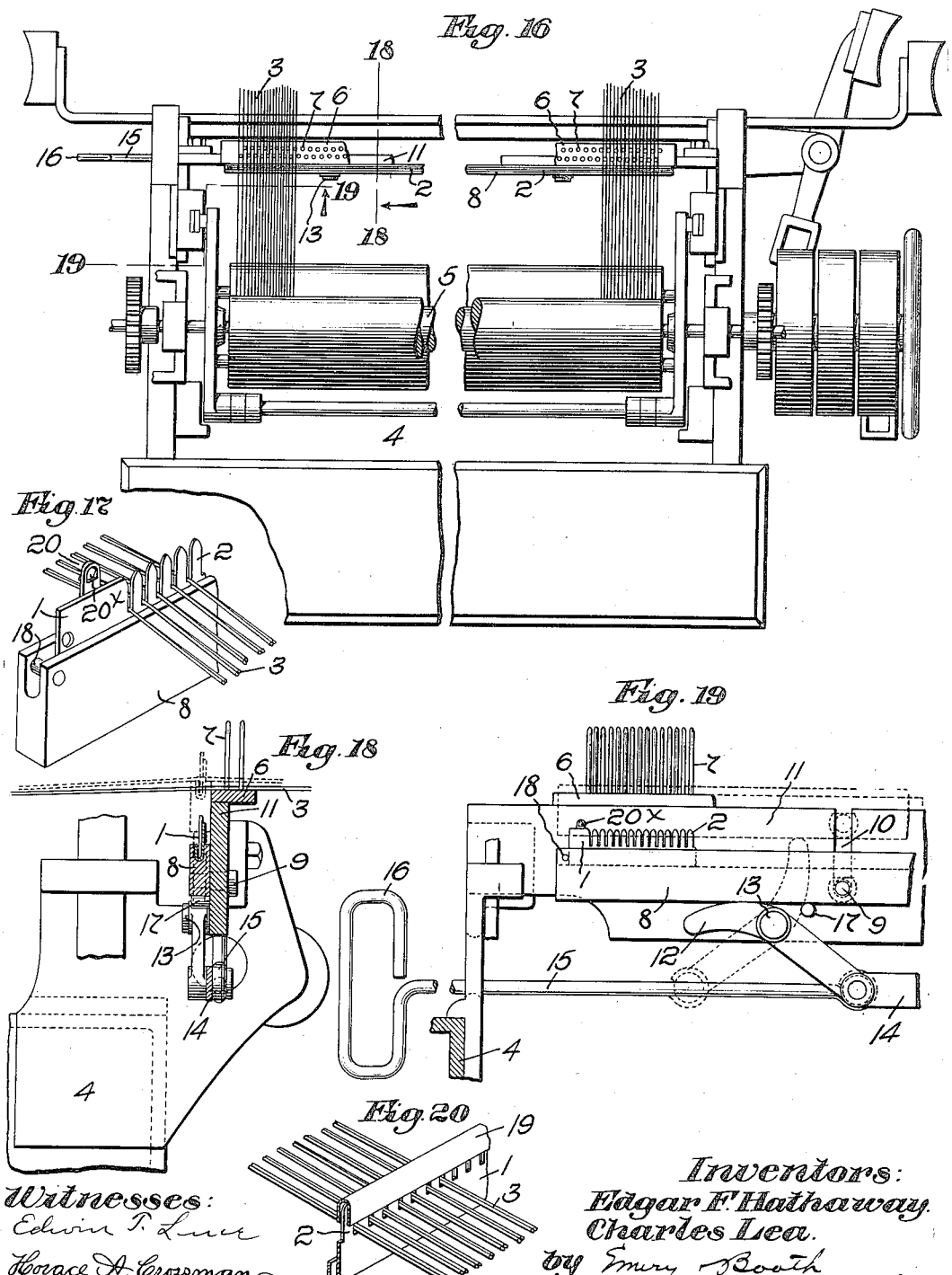

UNITED STATES PATENT OFFICE.

EDGAR F. HATHAWAY, OF DORCHESTER, AND CHARLES LEA, OF BOSTON, MASSACHUSETTS, ASSIGNORS TO AMERICAN WARP-DRAWING MACHINE COMPANY, A CORPORATION OF MAINE.

MECHANISM FOR HANDLING TUFT-YARNS FOR CARPET-LOOMS.

1,153,865.  Specification of Letters Patent.  Patented Sept. 14, 1915.

Application filed April 24, 1909. Serial No. 492,038.

*To all whom it may concern:*

Be it known that we, EDGAR F. HATHAWAY and CHARLES LEA, both citizens of the United States, and residing, respectively, at Dorchester and Boston, both in the county of Suffolk and State of Massachusetts, have invented an Improvement in Mechanism for Handling Tuft-Yarns for Carpet-Looms, of which the following description, in connection with the accompanying drawings, is a specification, like numerals on the drawings representing like parts.

Our invention relates to the manufacture of carpets or rugs of the Axminster and similar types, being more particularly concerned with the provision of improved means for placing the tuft yarns, customarily used in the weaving of such carpets or rugs, in the separate tubes of a tube frame of the type ordinarily employed with carpet looms of this class.

Our invention will be best understood by reference to the following description when taken in connection with the accompanying illustration of one specific embodiment thereof, while its scope will be more particularly pointed out in the appended claims.

In the drawings: Figure 1 is a plan view of a machine for tubing the tuft yarns, such machine embodying one form of our invention, the same being broken away so that a larger scale may be employed; Fig. 2 is a similar view of the same machine shown in front elevation; Fig. 3 is a detail in perspective of the locking bar for the spool holder; Fig. 4 is a detail in end elevation showing the connection of the transfer comb to the ends of the spool. Fig. 5 is a side elevation on an enlarged scale, in section, taken on the line 5—5 in Fig. 1 and looking in the direction of the arrow; Fig. 6 is a detail in perspective showing the relation of the tubes and needles to their respective guiding devices; Fig. 7 is a plan showing a portion of the needle holder with the needles and retaining plate removed; Fig. 8 is a sectional view similar to Fig. 5 but showing the needles and coöperating parts in a different position; Fig. 9 is a view in perspective of one end of the transfer comb; Fig. 10 is a sectional elevation showing a portion of the machine on an enlarged scale, such section being taken on the line 10—10 in Fig. 2, looking in the direction of the arrow; Fig. 11 is a sectional detail of the sliding support for the vertically fixed knife of the shearing mechanism; Fig. 12 is a front elevation, partly broken away, showing one end of the machine with the transfer comb shifted laterally; Fig. 13 is a detail showing the device for automatically throwing off the power from the machine; Fig. 14 is a side elevation of one end of the machine, partly broken away, showing a portion of the driving mechanism; Fig. 15 is a section on the line 15—15 in Fig. 14, looking in the direction of the arrow; Fig. 16 is a plan of a portion of the spooling machine showing the attachment thereto for receiving the transfer comb; Fig. 17 shows in perspective a portion of the holder for the transfer comb; Fig. 18 is a side elevation showing the relation of the vertically movable comb holder to the spooling machine; Fig. 19 is a front elevation, partly in section, of the comb holder and spooling machine shown in Fig. 18; and Fig. 20 is a view in perspective of the transfer comb with its cap or retainer applied.

Referring to the drawings and to the particular embodiment of our invention there shown, we have there illustrated in Figs. 1 to 15 inclusive a machine wherein the spool to 15 inclusive a machine wherein the spool carrying the tuft yarns wound thereon may be placed and held in such relation to the tubes of a tube frame that, by a single operation, the entire series of tuft yarns may be placed or inserted with great certainty and accuracy through the tubes by suitable yarn-placing means, herein a series of needles, one for each tube.

Referring first to the preparation of the tuft yarns prior to installation in the tubing machine, we have shown in Figs. 16 to 20 inclusive means whereby the tuft yarns, after being wound upon the spool in the spooling machine, may be held separated, and maintained in such separated condition, while placed in the tubing machine so that they may be drawn accurately through the tubes of the tube frame.

Referring to Figs. 16 to 20 inclusive we have there shown a separating device comprising the transfer comb 1, preferably formed of sheet metal, and presenting a series of upright teeth 2 formed with preferably well rounded or beveled tips. This comb is so placed in the spooling machine with relation to the tuft yarns that, after the latter have been wound upon the spool, it may be applied to the yarns 3 between the teeth 2, as indicated in dotted lines in Fig. 18. For illustration a common form of spooling machine 4 is represented in Figs. 16, 18 and 19, this being provided with well-known mechanism for receiving the spool 5 and winding the tuft yarns about the same. During such operation the yarns unwind from bobbins (not shown), the usual reed or separator 6 being provided which presents upright pegs or their equivalents 7 for separating, and keeping separated, the individual strands or groups of strands as they pass to the spool. The comb 1 is supported with its teeth upright by a suitable holder 8 immediately below the tuft yarns, where the latter leave the reed so that, when the comb is elevated (Fig. 18) the teeth are caused to pass between the sets of strands, as shown in Fig. 17. The comb may be constructed of sheet metal and the lower edge curled over, as shown in Fig. 20, so that the turned over edge may rest in a groove or pocket in the holder 8. The latter consists of a cross-bar provided with two or more studs 9 which have a sliding fit each in a vertical slot 10 in the frame member 11 of the machine. This permits an accurately guided vertical movement of the holder and the comb. For raising the latter, cam levers 12 are provided, pivoted each at 13 on the frame and having their lower ends connected by the link 14, to which is attached the transverse pull rod 15 having the handle 16. The lower edge of the holder rests upon these cam levers so that, when the latter are turned by pulling the handle 16, the holder is raised to the dotted line position shown in Fig. 19, upward movement of the holder being limited by contact between each cam lever and a stop pin 17. When the handle is pushed in, the cam levers are restored to their normal position and the holder drops of its own weight, or may be pushed down by the attendant. The comb, when inserted in the holder, fits between two transverse pins 18, arranged one at each end thereof, so that the teeth of the comb are caused positively to aline with the pegs in the reed and to pass with certainty between adjacent sets of yarn strands when the comb is raised.

After the spooling operation, the comb, which has been previously inserted in the depressed holder 8 and is then positioned as shown in Fig. 18, is elevated to the dotted line position shown by pulling out the handle 16, each set of strands entering a separate space between the teeth of the comb. The cam levers move past a vertical position when the handle is pulled out, so that the comb is held elevated until the handle is again pushed in. With the holder elevated, the yarns are prevented from slipping out of the comb by the application thereto of a cap piece or retainer 19, which latter preferably consists of a bent or turned over metallic strip adapted to slip over the points of the teeth and close the mouths of the slits against the exit of the yarn strands, preferably, however, without clamping or gripping the yarns or otherwise preventing their free longitudinal draft between the teeth. The cap may be retained on the comb by any suitable means as, for example, by means of a resilient finger piece 20 (one of which is shown in Figs. 9 and 17) riveted or otherwise secured one at each end of the comb, and having an end provided with a lateral projection 20×. The finger is adapted to pass through an opening in the crown of the cap so that the projection may engage the end thereof and hold the cap against displacement (Fig. 9). The locking finger, however, is sufficiently resilient to permit its being bent back to release the cap from the projection and allow the withdrawal of the cap therefrom at will. With the retaining cap piece in position, the comb may then be withdrawn from the holder and attached to the spool by suitable means so that, no matter how much the spool may be handled in transference or how long afterward the tubing operation may be performed, the comb cannot be accidentally displaced.

In the described embodiment of our invention (Fig. 9) we have shown the comb provided at each end with an attachment member, herein in the form of a spring 21. The latter has an eye 22 (see Fig. 4) which may be slipped over the small pintle 23 at the end of the spool 5 and employed to attach the comb to the spool, the former having first been laid flatwise against the wound-on yarn. The yarn strands can then be severed, leaving them in the condition represented in Fig. 4 and the spooling operation can thereafter proceed in the usual manner and the described operation repeated as to another spool. The attaching springs 21 are preferably each provided with means, such as the angular clip 24, whereby the operative can readily apply the spring eye 22 to the pintle or release the same therefrom. It will be seen that this provides a means for permanently holding the comb in definite relation to the spool and the wound-on yarn until required for the tubing operation without the necessity, however, of clamping the yarns in the comb. The comb (see Fig. 4) being drawn flatwise against the wound-on yarn acts as a clamp preventing the unwinding of the yarn from the spool. In this condition each spool is ready for the tubing operation, but may be laid aside for an indefinite period before such operation without impairing in any way its adaptability therefor.

Referring now to the tubing or threading machine (see Figs. 1 and 2), the latter comprises end frame members 25 between which, near the front of the machine, there extends a bed piece or plate 26. The latter carries a second plate 27 (see Fig. 10) which serves as a support or rest for the tube frame, as a support or rest for the tube frame, as a support or rest for the tube frame, which latter is inserted in the machine with the tubes 28 resting on the plate with their small ends pointing inwardly, and the tube-connecting bar 29 resting against the front edge of the two plates 26 and 27. Preferably two or more brackets or hangers 29ˣ are provided having bent ends overlying the front end of the tube-connecting bar 27, these acting to position the tube frame and also to hold flat against the tube bar the spring clips 30 which are fastened thereto, the said clips being utilized, when the tube frame is applied to the spring, to frictionally engage with the spool ends and hold the tube frame in fixed position thereon. Preferably means are provided which tend to aline, and hold alined, the individual tubes, with the needles, such means being herein embodied in the form of a swinging clamp bar 31 (Fig. 10), which latter is pivoted in upright brackets 32, the latter mounted upon the end of the bed plate 26 and provided at one end with the hand lever 33, so that it can be swung into or out of engagement with the tubes. To delicately adjust the position of the clamp bar, the latter is held at each end (see Fig. 1) in a socket member 34, the latter journaled in the bushing 35 eccentrically mounted in the bracket and held adjustably fixed by means of the set screw 36. The clamp along its active edge is provided with teeth or serrations 37 (see Figs. 6 and 10) which are adapted to enter and fit the space or depression between adjacent tubes so that, when the clamp bar is swung over from the dotted line position shown in Fig. 10 to the full line position there shown (also shown in Fig. 6) the teeth enter between the tubes and clamp the tube frame in alinement with the needles. The rear corners of the teeth, or those which first engage the tubes, are preferably beveled or otherwise shaped so that they act as wedges and, entering between the tubes, wedge the tube frame laterally into the required alinement with the needles if the latter happen to be offset slightly to one side or the other of the required position. By this means the tube frame is not only held clamped, but is automatically brought with certainty into the required alinement.

Referring now to the means for installing and holding the spool and the wound-on yarn strands in the machine, the latter is provided with holding brackets 38 depending from the bed plate, in which the ends or heads of the spool are placed. After insertion the spool is locked against turning or withdrawal by means of a locking dog or shoe 39, one being pivoted on each holding bracket. To control the locking dogs simultaneously for the locking or release of the spool, each dog is provided with a pin 40 which projects up through a slot 41 (see Figs. 3 and 10) in a transverse locking bar 42. The latter extends across the machine and terminates in a grasping portion 43, so that the operator can move it endwise. The holding brackets are transversely slotted to slidably support the bar, the latter being held in the slots by removable retaining pins 44. The pin-receiving slots 41 in the bar are so shaped as to cause the locking dogs to swing up or down as the bar is moved transversely, the dogs being represented as swung down in Fig. 10. When swung up, the locking dogs permit the introduction or withdrawal of the spool heads from the holder, but, when swung down, assume the position shown in Fig. 10 where they reach out along the edges thereof sufficiently to retain the spool in the holder. As shown in Fig. 10, the contacting edges of the dogs are provided with teeth 45 which grip the wooden edges of the spool head, there being provided in each holder a spring-pressed pin 46 adapted to bear against the head of the spool and tending to throw the latter against the dog. The teeth are so shaped that they oppose unwinding movement of the spool. For purposes of yarn adjustment, however, when installing the spool in the machine, the yarn can always be unwound without unlocking the dogs by pressing the spool in the holder against the yielding pin 46 which frees the spool heads from the dog teeth. While the operator can thus readily free the spool to unwind it or can turn the spool while retained in the holder to wind up the yarn, it will be noted that it is securely locked against any pull received along the line of draft of the free ends of the yarn after the latter has been led upwardly into the machine. The rear edge of the locking bar is provided with inclined portions 200 which contact each with a pin 201 (Figs. 1 and 10) depending from the hangers 29ˣ, and the latter are each pivoted at 202 so that, when the locking bar is moved to release the spool it also acts, through the pins 201, to draw down the hangers about their pivots and release the tube frame for withdrawal. The hangers are returned by hand to the holding position shown in Fig. 10 after the installation of another tube frame in the machine. Having locked the spool in the holder the operator disconnects the comb therefrom, and, after pressing back the spool in the holder to release it and unwind a sufficient length of yarn, he places the comb in the grooved comb holder 47 located in front of, and at a level just above, the tube frame, the yarn strands therefore assuming the position shown by dotted lines in Fig. 10.

Referring now more particularly to Figs. 1, 5, 7 and 8, the needles 48, of which there is one for each tube, are carried upon a suitable cross-head or holder 49 and so arranged that at the proper time they may be projected forwardly each through one of the tubes to seize a yarn strand or strands, and draw the same through its tube from the larger to the smaller end thereof. The needles are spaced in the cross-head by the provision of transverse slots 50 in the latter, in each of which is placed a needle. They are secured against longitudinal movement by means of a key 51 (Fig. 5) which is positioned partly in a slot 52 cut lengthwise the cross-head, and partly in a slot cut in the lower edge of each needle shank. The needles are held clamped in the cross-head by means of one or more clamp plates 53 bolted to the top face of the slotted cross-head. Preferably a plurality of clamping plates are shown so that a broken needle may be removed from any part of the cross-head without disturbing the fastening for other needles except those closely adjacent. The needle cross-head, as shown in Figs. 1, 5 and 14, is fixedly secured at each end to a slide bar 54, the latter adapted to slide through bearings or guideways, one of which, 55, is shown at the rear of the frame piece 25, and the other of which, 56, is supported at the front thereof. To retract or advance the needles the lower edge of each slide bar is provided with rack teeth 57 which mesh with gears 58, the latter secured to the operating shaft 59. The shaft 59 is turned (see Figs. 1, 2 and 5) by means of a pinion 60 secured at one end thereof and meshing with a gearing segment 61, the latter carried by the lever arm 62 pivoted at 63 to the frame. At its rear end the lever arm carries the cam roll 64 which is engaged by the track cam 65. The latter is fixedly secured to the transverse shaft 66 and has its periphery cut with gear teeth 67 meshing with the pinion 68 on the main power shaft 69 of the machine. Through the application of power to the shaft 69, as will be more fully described, the cam is turned and the needles advanced and retracted at the proper time.

In Fig. 5 the needles are shown in their rearward position and in Fig. 8 in their advanced position, wherein their hooked ends have been projected through the tubes and beyond the line of yarn strands. With the needles in this position the yarn strands are then given a slight lateral movement to lay the yarn across the needles and within the path of the needle hooks to be seized by the latter on their return. In the present embodiment of our invention this is accomplished by shifting the transfer comb itself, this acting, because of the close relation which the transfer comb bears to the needles and tubes, to lay the yarn strands with certainty across the needles and within the hooked portions thereof, as represented in Fig. 12. Preferably the shifting operation is performed mechanically and immediately following and consequent upon the assumption by the needles of their extreme advanced position shown in Fig. 8. To this end the holder 47 of the transfer comb (Figs. 2 and 12) is secured at its opposite ends to upright supporting arms 70 which, at the lower ends are fixedly secured to the transverse shaft 71, the latter mounted for longitudinal sliding movement in the frame members 25. One end of the shaft 71 is provided with a collar or enlargement 72, between which and the adjacent frame member is provided a coiled spring 73 normally holding the shaft and supporting arms in the position shown in Fig. 2. At the opposite end of the shaft, however, there are provided devices whereby at the appropriate time the shaft may be moved endwise, thereby moving the holder and the comb from the dotted line position shown in Fig. 12 to the full line position there shown.

Referring more particularly to Figs. 2, 14 and 15, at the extreme end of the shaft there is provided a collar 74 fixedly secured thereto, such collar being provided with a rocker arm 75, for a purpose to be later described. Mounted to turn freely about the shaft and next to the collar 74 there is also provided the actuating arm 76 carrying the projecting portion 77 from which extends the transverse pin 78. The latter bears against the cam face 79 of the adjacent arc-shaped cam 80 which is fixed to the adjacent frame member 25. The face 79 of the cam presents an inclined path so that, when the actuator arm is turned, the pin is caused to ride up on the face of the cam, presses the arm against the collar and thereby forces the sliding shaft 71 outwardly in its bearings, compressing the spring 73 at the opposite end and shifting the transfer comb to the position shown in Fig. 12. The cam face is flat beyond the inclined portion referred to, so that the actuator arm may be moved still further without altering the longitudinal position of the transfer comb. The actuator arm 76 is normally drawn to its rearward position by the spring 81 (Fig. 14) but can be moved automatically to shift the comb at the required time by means of the pusher rod 82, one end of which is seated in a socket in the actuator arm and the opposite end in a socket formed in the end of the upright lever arm 83. The latter is pivoted on the frame at 84 and carries the cam roll 85 which presses against the face of a suitably formed cam 86 secured to the counter shaft 66 so that it is turned (in the direction of the arrow) in synchronism with the needle cam 65. The cam is so shaped that no movement is imparted to the actuator arm until the needles have been projected through the tubes and beyond the yarn strands. The transfer comb is then shifted longitudinally by the raised portion of the cam (designated) as 87 engaging the roll, and the yarn strands are moved from substantially vertical lines and laid across the shanks of the needles, as represented in Fig. 12, so that the retraction of the needles which immediately follows results in the seizure of the appropriate yarn strands by each needle. If the needles on their retractile movement are permitted to draw the yarn entirely free from the fixedly held transfer comb, there is sometimes a tendency for the ends of the yarns to become entangled with each other and snarled up in the comb, and there is, moreover, a considerable strain maintained in the yarns, and excessive frictional wear results between the yarns and the moving needles. To avoid this we preferably permit the needles to seize the yarns and draw them into the tubes or far enough to render their engagement by the needles and their disposition certain and then, by movement of the transfer comb itself, free the latter from further engagement with the yarns. This movement of the comb, which here completely frees the yarns therefrom. frees the threads from the previous state of tension or partial tension, giving them such slack, relaxation or freedom that they can be drawn into the tubes without imposing any severe strain either on the yarns or on the needles. Further retractile movement of the needles can therefore take place without entanglement of the yarns with each other or with the teeth of the comb, or drag upon the needles. For this purpose we have provided means for giving the transfer comb an outward movement to free the same from the yarns and also for temporarily suspending the retractile movement of the needles during such comb freeing operation.

Referring to Fig. 14, when the needles have seized the yarns and have retracted to a position just within the tubes, as represented by dotted lines in Fig. 14, the portion 88 of the cam 86 engages the cam roll 85 and initiates a further movement of the lever arm 83 and the actuator arm 76. At the same time, the movement of the needles is preferably stopped by an appropriate formation of the needle cam. The additional movement of the actuator arm serves to bring the projecting shouldered portion 89 of the arm against a pin 90 located across of the path of the shoulder and carried by the rocker arm 75. Further movement of the actuator arm is accompanied, therefore, by movement of the rocker arm and also by a rocking movement of the shaft 71, carrying with it the supporting brackets 70 and the comb holder and comb. Sufficient rocking movement is given the comb holder shaft to carry the brackets to some such position as is indicated in dotted lines in Fig. 14 at which the comb is cleared or freed from the yarn ends and the latter hang loosely from the larger ends of the tubes into which they have been partially drawn. The needles then again continue their retractile movement, drawing the yarns completely through the tubes and, the cam 86 continuing to turn, the actuator arm 76 is gradually swung back to its initial position, permitting the spring 73 to swing back the comb holder and then shift it laterally to its original position. In order to bring the comb holder back to a fixed starting position there is preferably provided on each supporting bracket positioning means, such as the adjustable stop pin 91 on the frame of the machine, against which there is adapted to abut the adjustable stud 92 on the bracket 70.

In the practical employment of this machine it is preferable that the needles be guided not only close to the tubes prior to entering the same, but that their hooked ends be rigidly spaced when out of use and retracted. Furthermore, it is also desirable to provide guidance for the ends of the needles projecting through the tubes and before seizure of the yarn, otherwise the tubes, which are apt to become bent and out of alinement through misuse, are likely to throw some of the needles to one side or the other of the desired position. Herein we have provided guidance for the needles close to the mouths of the tubes where they enter, the guiding means being capable of retraction with the needles to permit the introduction of suitable yarn-shearing devices between the tubes and the needles, such guiding means herein also holding in rigid separation the hooked ends of the needles when retracted. To this end there is provided the transverse guide bar 93, which is slotted to receive each needle and hold it in separated relation to adjacent needles, as represented in Fig. 1. Such guide bar is secured at its ends to the supporting rods 94, the latter slidably mounted in the cross-head 49. Each rod 94 is yieldably connected to the cross-head by means of a spring 95 (Figs. 5 and 8), and is thereby thrown forward to bring the guide bar close to the needle hooks when the latter are retracted. The forward movement of the bar is limited by means of a pin 96 in each rod, which pin abuts against the cross-head or holder. When the needles are advanced the guide bar 93 is advanced with them until the needle hooks are within the mouths of the tubes, when the guide bar is brought to rest by abutment against the inner edge of the tube-supporting plate 27 (see Fig. 8). The needles then continue their advance through the tubes merely stretching the connecting springs 95, the guide bar being subsequently returned with the needles to the position which in Fig. 5 after the latter emerge from the tubes with the engaged yarn strands.

In order to prevent any slight displacement of the guide bar from the desired relation to the tubes, means are provided for enforcing its alinement with the tubes prior to the entrance of the needles into the latter. Herein for this purpose the guide bar is provided at each end with two forwardly projecting alining members 97 which (see Figs. 1 and 5) have beveled edges for contacting with the inner walls of the upright brackets 32 prior to the entrance of the needles within the tubes and insuring the positioning of the guide bar in predetermined relation to the tubes. The tubes, in turn, when positioned in the machine, are definitely alined with relation to the guide bar by any suitable positioning means. Herein upright positioning pins 98 (Fig. 2) are employed, the same being carried by the supporting plate 27. These pins are so spaced that they require the tubes to be placed in a definite position between them. A single pin only may be employed, if desired, the operative placing the tube frame in the machine with reference to the single pin and permitting the alining clamping 31, when subsequently applied, to enforce, if needed, definite alinement with the needles. The comb, in turn, when it is seated in the tubing machine with the connected yarn strands, is also positioned by alining means so as to bring the yarn strands into definite relation with reference to the path of the needles. Such positioning means are herein provided in the form of positioning pins 99 (see Fig. 1) in the comb holder, between which pins the ends of the comb must be inserted. It will thus be seen that the yarn transfer comb is definitely and predeterminately related first to the reed pins in the winding machine and later to the needles and tubes in the tubing machine so that the yarns are received from the bobbins, then transferred and later presented to the needles for the tubing operation by the same instrumentality, i. e. the transfer comb. Large numbers of transfer combs may be employed in practice of standard dimensions so that, not only may the same comb be repeatedly applied to the winding machine, with assurance that the teeth will exactly aline with the reed pins, or to the tubing machine with assurance that the teeth will exactly aline with the needles and tubes, but successive standard combs may be used in each machine with certainty that the yarns held by one clamp will bear exactly the same relation to the reed pins, needles and tubes as the yarns held by another clamp where the same pattern has been used in each case. This not only provides effectually for the transference of the yarn strands from one machine to the other and for the tubing of the yarns with the minimum chances of disarrangement in the intended pattern, but, by the use of a single standard instrument of transference which relates the yarns as seized by the needles to the yarns as separated by the reed pins, great rapidity of operation is secured with a minimum of attention on the part of the operator.

To provide guidance for the needles on the opposite side of the tubes, means are preferably provided whereby the needles, as they emerge from the tubes and before engaging the tuft yarns, are directed into the proper course. Any suitable means may be employed for this purpose, and, if desired, such guiding means may be carried and presented by the swinging clamp bar 31, but herein there is provided an additional member comprising a needle guide bar 100 extending across the machine and adapted to be swung down directly in front of the large ends of the tubes and in the path of the needles as they emerge therefrom. Such needle guide is carried at each end upon arms 101 (Figs. 1, 2 and 10) pivoted in extensions 102 of the brackets 32, and is provided at one end with a depending lever arm 103, by means of which the guide bar can be swung from the full line position shown in Fig. 10 to the dotted line or active position also there shown. The edge of the needle guide is provided with teeth 104 (Fig. 6), which are adapted to swing down in between the needles, and, as the latter emerge from the tubes, wedge such as are out of alinement into the required alinement. Herein the needle guide is automatically depressed and properly timed in its action with relation to the needle advance. For this purpose the lever arm 103, which is normally drawn back by the spring 105 secured at its opposite end to the machine frame, is thrown forward to swing the needle guide down, as described, by means of a pin 106 carried laterally by the adjacent slide rod 54. This pin engages the lever arm 103 and swings the needle guide down. This preferably takes place just as the needles are emerging from the tubes, and the lever is provided with an inclined end 107 which rides up on the pin as the needles continue to advance, so that the needle guide, when swung down, is held there until the needles have seized the yarn strands and drawn them back into the tubes, whereupon the pin 106 moves back and allows the lever 103 to swing back. The lever arm is shown as engaged by the pin 106 in the dotted line position shown in Fig. 10. The provision for the effectual guidance of the needle both in entering and emerging from opposite ends of the tubes practically enforces and insures in every instance the drawing of the intended pattern.

It is to be understood that the guiding devices for the needles between the yarns and the tubes not only act to correct faulty alinement of the needles due to disarrangement of the tubes as mentioned, but also forcibly to guide and direct the needles while advancing and passing through the yarn, as well as to hold them positively fixed in position during the shifting of the transfer comb. It is to be understood that these three functions or any of them may be performed by separate instrumentalities or by the same instrumentality, and that our invention, in its broad aspects, is not necessarily limited to a machine where guiding devices are employed performing all three functions specified.

Prior to use in the loom it is necessary to cut the drawn-in yarns evenly at a fixed predetermined distance from the ends of the tubes. Herein we have provided shearing means whereby this is automatically accomplished in the same operation with the tubing of the yarns. To this end there is provided a vertically fixed knife 108, which, however, is supported at the rear edge of the bed plate so as to be capable of a slight yielding movement toward the plate. To secure this the knife is supported on studs 109 (Fig. 11) each slidably mounted in a pocket in the bed plate and provided with an upright pin 110 working in a small transverse slot 111 in the plate. Relatively stiff springs 112 are seated at intervals in the bed plate and bear against the knife to force the latter back with the pins 110 to the rearward limit of the slots 111.

The yarn strands, when drawn back by the needles, lie directly over the upper edge of the knife 108 and in that position are cut off by the downward movement of the vertically movable knife 113. The latter has an inclined edge, as shown in dotted outline in Fig. 2, and at its extreme left-hand end, as viewed in Figs. 1 and 2, which end when depressed first meets the fixed knife blade, it is connected to a cam member 114 (see Figs. 1 and 5) having a lower beveled edge, as shown at 115 in Fig. 8. The blades are so arranged that the vertically movable one 113, when elevated, lies somewhat over the stationary fixed blade, and when depressed, acts first, through the cam member 114, to wedge the blade 108 forward against the yielding springs 112. Thus, as each succeeding portion of the blade edges cross, the shearing action is accomplished by a pressing back of the stationary fixed blade, thus giving in effect the action of a pair of shears, and imparting a clean shearing cut to the yarn.

To impart suitable and appropriately timed movement to the vertically movable blade, the latter is bolted to the transverse supporting beam 116 which, in turn, is fixedly secured at each end to a vertically reciprocable plunger rod 117, the latter guided for sliding movement in upper and lower brackets 118 and 119, respectively, attached to the frame member 25. One side of each plunger rod is toothed to form a rack 120, and this engages in each case with a pinion 121, the latter secured to the shaft 59 which carries the main driving gear 60 and the needle-operating gear 58. The parts are so geared that, as the needles are retracted out of the path of the shearing mechanism, the latter descends from the position shown in Fig. 8 to that shown in Fig. 5 and trims the ends of the drawn-in yarns. On the other hand, when the needles are advanced, the upper blade member is lifted up and out of their path.

In practice it is quite necessary that the projecting ends of the drawn-in yarns should be trimmed evenly and with certainty to the required distance from the ends of the tubes. In order that the tube frame, when withdrawn from the machine, may have the yarn strands cut the required length and may also be held fixed in this relation on the spool, thus being ready for the loom without the need of any further step or operation, means are preferably provided so that, after shearing, and preferably when sheared, the ends of the yarn strands are held clamped and the tube frame is also held clamped. This permits the operator to remove the spool from its holder, wind up the slack yarn thereon, and apply the spool to the tube frame by inserting the pintles 23 thereof in the end springs 122. These springs are customarily provided on the tube frame for that purpose and, when the latter is installed in the machine, project outwardly from the machine, as shown in Figs. 5 and 8. The spool then occupies the position shown in dotted lines in Fig. 10, and the tube frame, spool and yarn ends, being definitely and fixedly positioned each relatively to the other, the tube frame and yarn ends may be released and withdrawn from the machine for use in the loom without further attention. To this end we have provided clamping or holding means for clamping the yarn strands between the small ends of the tubes and the knife. Such clamping means may be embodied in various forms, but herein we have provided a holding bar 123 extending across the machine and carried by the shearing mechanism so that, when the needle is advanced, such bar is elevated with the knife 113 out of the way, as shown in Fig. 8. When the needles are retracted, however, and the shearing blades descend, the holding bar is brought down across the drawn-in yarn ends, clamping them tight against the flat top of the bed plate 26, as shown in Fig. 130

10. Preferably, though not necessarily, the holding bar engages with the yarns just prior to the shearing operation so that, before being cut, the yarns are gripped tight over the bed plate and relatively near the knife, their displacement from the taut drawn-in position being thereby prevented, and the accuracy with which the yarn is trimmed down relatively to the ends of the tubes being increased.

Referring to the details of the holding bar, the latter is fixedly secured to the slotted lower ends of two or more vertical plunger pins 124. Each of the latter is provided with a coiled spring 125 compressed between the bar and an overhanging supporting arm 126 on the beam member 116, and acting to depress the holding bar to its lowermost position (Fig. 8). Its downward movement is limited by an abutment, such as the collar 127 carried by each pin, which abutment contacts with the upper side of the beam supporting arm 126. On the depression of the shearing blade the holder bar clamps the drawn-in yarns just prior to the shearing cut, subsequent depression of the blade resulting merely in compressing more or less the restoring spring 125. The holder bar may be of any suitable material and of any desired shape, but herein is formed of a metal strip or plate with a lower rounded or beveled edge.

In order that the yarns may be released from the holder bar for the withdrawal of the spool and tube frame from the machine, as described, while still leaving the needles retracted and the shearing blade depressed (in which position it will be noted the parts are ready for the drawing-in of the next set of yarns subsequently to be presented to the machine), means are provided for independently lifting the holder bar and releasing the yarns without moving the main operating mechanism or lifting the shearing blade. Herein such release is effected simultaneously with the releasing movement of the tube clamp 31. For this purpose each collar 127 on the plunger pins 124 is provided with a forwardly directed finger 128, which (see Fig. 10) overlies the clamp bar 31 so that, when the latter is swung up by the handle 33, projecting pins 129 (Fig. 10) carried by the clamp bar engage each one of the fingers 128 and lift the holder bar 123 against the compression of the springs 124, so that the yarn ends are free to be withdrawn from the machine with the spool and tube frame. The elevated position of the holder bar and fingers will be clear from the dotted lines shown in Fig. 10. The operator, therefore, having drawn in and trimmed the yarn strands, releases the spool by movement of the releasing bar 42, winds up the slack on the spool and, fastening the latter to the tube frame springs 122, as described, the yarns meanwhile being held fixed by the holding bar, so that no displacement can take place. Movement of the handle 33 thereupon serves to release both the tube frame and the yarns for withdrawal from the machine.

While the driving shaft 69 may be provided with levers or other suitable devices for turning the same by hand to provide for the manual operation of the machine, in the illustrated form such shaft is provided with a driving pulley 130, to which power may be applied from any suitable source through a belt, and devices are also provided whereby such pulley may be clutched to or unclutched from the shaft at will. For this purpose any suitable form of clutch may be employed, there being herein shown a common form of split internal expanding ring 131 adapted to be spread by the wedging finger 132 (Fig. 14) to cause the ring to grip the inner walls of the pulley. The wedging finger 132 is adapted to be moved to clutching position by longitudinal movement of the tapered expanding member 133, the latter being slidably mounted upon the driving shaft at the side of the pulley and moved lengthwise the shaft by the yoke 134 which is provided with pins engaging a circumferential groove 135 in the expanding member. When the yoke is rocked by means of the rock shaft 136, which is mounted transversely the machine in suitable journals in the frame, it serves to grip the expanding ring 131, which is fast to the driving shaft 69, to the driving pulley 130, which is loose thereon.

To rock the yoke the operator may avail himself either of the foot treadle 137, which is connected by the link 138 and the lever 139 to the rock shaft, or may avail himself of the handle 140, which is fastened to the end of the lever 139 and located conveniently just below the position of the spool when installed in the machine. Having installed the yarns in the machine, therefore, he can start the machine by merely dropping his hand and pressing down on the lever handle 140. The handle also serves as an emergency cutout, so that the operator can, if required at any time, shut off power from the machine and stop the latter by lifting the hand lever and releasing the clutch. If the hand lever is not moved, the machine will automatically throw the clutch out on the completion of the retractile movement of the needles. To this end the rock shaft 136 at its rear end is provided with an arm 141, which carries a small frame piece 142 (see Fig. 13), the latter serving as a holder for the catch 143 which, when the clutch is thrown in, lies within the path of a pin 144 projecting from the face of the adjacent cam 86. With the clutch thrown in, the frame and catch lie in the position shown in dotted lines, Fig. 13. Just before the cam shaft has turned fully to retract the needles, the catch is engaged by the pin and lifted. The catch, however, is carried by a block 145 having a slight sliding movement in a slot 146 formed in the frame, so that the block moves upward, then contacts with the end of the slots, lifts the frame, and gives a partial turn to the rock shaft. This is sufficient to loosen the frictional hold of the expanding member 133 on the wedging finger 132, and the compression spring 152 (Fig. 1), arranged co-axially therewith, throws the clutch completely out of engagement as the needles reach their rearmost position. At the same time, the catch, slipping off the edge of the pins, drops again to the full line position shown in Fig. 13 so as to offer no obstruction to the subsequent inward movement of the catch which accompanies the throwing-in of the clutch by the handle 140. In order to stop the further movement of the machine due to momentum thereof when the clutch is thrown out, the drive shaft 69 is also provided with a brake drum 147 which is encircled by a brake band 148, the latter having one end fastened to the adjustable threaded pin 149, and the opposite end to the block 150, which latter is secured to the arm 151 keyed or otherwise fixed to the rock shaft 136. When the rock shaft is turned to throw in the clutch the brake band is released, and when turned to throw out the clutch the brake band is applied.

While we have herein shown and described one specific form of our invention for purposes of illustration, it is to be understood that the same is not limited to the details of construction, nor to the specific arrangement of parts herein shown, but that extensive deviations may be made from the illustrated embodiment without departing from the spirit thereof.

Claims:

1. In a machine for threading tuft yarns for carpet manufacture, the combination with a plurality of needles, tube-holding means, means for guiding the needles prior to the entrance within the tubes, and means for alining the said guiding means.

2. In a machine for threading tuft yarns for carpet manufacture, the combination with a plurality of needles, of a needle guide adapted to advance with the needles toward the tubes and alining means for alining the needle guide prior to the entrance of the needles within the tubes.

3. In a machine for threading tuft yarns for carpet manufacture, the combination with means for holding the tube frame, a plurality of needles, means for moving the needles to pass through the tubes, a shearing member below the path of needle travel, and a needle guide adapted to advance with the needles to a position between the tubes and the shearing member.

4. In a machine for threading tuft yarns for carpet manufacture, the combination with tube-holding means, of a plurality of needles, means for moving the same, means for holding separated the free ends of the yarns, and means for moving the said yarn holding means after seizure of the yarns by the needles to free the yarns from the same.

5. In a machine for threading tuft yarns for carpet manufacture, the combination with a holder for the free ends of the yarns, a plurality of needles, means for holding the tubes, means to advance the needles to engage the yarns and draw them through the tubes, and means for giving the holder a yarn-freeing movement after engagement of the needles with the yarns.

6. In a machine for threading tuft yarns for carpet manufacture, the combination with a plurality of needles, a yarn holder, means for holding the tubes, means for moving the needles to engage the yarns and draw them through the tubes, and means for suspending the retractile movement of the needles after the same have hooked the yarns and simultaneously giving the holder a yarn-freeing movement.

7. In a machine for threading tuft yarns for carpet manufacture, the combination with tubes and needles, of a yarn holder having a lateral movement relatively to the needles and a yarn-freeing movement at right-angles thereto away from the needles.

8. In a machine for threading tuft yarns for carpet manufacture, the combination with tube-holding means, yarn-holding means and a plurality of needles, a needle holder, and a plurality of clamping sections for clamping said needles to said holding means.

9. In a machine for tubing tuft yarns for carpet manufacture, the combination with spool-holding means of means for holding the tubes, holding means engaging the tube frame, and common releasing means for the spool-holding means and the tube frame holding means.

10. In a machine for threading tuft yarns through the tubes of a tube frame for use in carpet and like looms the combination with a needle serving as the threading device of means for holding the yarns in separated and predetermined order and mechanism for causing relative movement between the yarn holding means and the tubes after the needle has engaged the yarn for the purpose of freeing the yarn from the yarn holding means.

11. In a machine for threading tuft yarns through the tubes of a tube frame for use in carpet and like looms the combination with a series or bank of needles that simultaneously draw the tuft yarns through the tubes by a relative movement between the tubes and the needles of means for holding the yarns in separated and predetermined order and mechanism for causing relative movement between the yarn holding means and the tubes after the needles have engaged the yarns for the purpose of freeing the yarns from the holding means.

12. In a machine for threading tuft yarns through the tubes of a tube frame for use in carpet and like looms, the combination with a series or bank of thread-placing devices, means for causing them simultaneously to place the tuft yarns through the tubes by a relative movement between the tubes and said devices, means for holding the yarns, and mechanism for causing relative movement between the holding means and the tubes to provide loose or tensionless yarn to assist in the tubing operation.

13. In a machine for threading tuft yarns through the tubes of a tube frame for use in carpet and like looms, the combination with a thread placing device of means for holding tuft yarns, means for holding the tubes, means for causing the thread placing device to place the tuft yarn through a tube, and means for automatically causing relative movement between the tubes and the said holding means, to untension the yarn.

14. In a machine for threading tuft yarns for carpet manufacture, the combination with a plurality of thread placing devices, of tube holding means, yarn holding means, means for moving the thread placing devices relatively through the tubes and back again, means for automatically and temporarily suspending retractile movement of the thread placing devices after the latter have engaged the yarns, and means during the suspension of said movement for moving the yarn holding means to render the yarns loose or tensionless for the subsequent thread placing movement.

15. In a machine for threading tuft yarns through the tubes of a tube frame for use in carpet manufacture, the combination with a series or bank of thread placing devices, means for holding the tube frame, means to move the thread placing devices to place the yarns simultaneously through the tubes, means for holding the yarns substantially taut across the path of the thread placing devices prior to engagement by the latter, and means automatically to move the yarn holding means after the thread placing devices have engaged the yarns to render the latter loose or tensionless, thereby to assist the subsequent yarn placing operation.

16. In a machine for threading tuft yarns through the tubes of a tube frame for use in carpet and like looms, the combination with a series of thread placing devices, means for causing them simultaneously to place the tuft yarns through the tubes by relative movement between the tubes and said devices, means for holding the yarns, mechanism for causing relative movement between the holding means and the tubes to untension the yarns while the thread placing devices are in the tubes.

17. In a machine for threading tuft yarns through the tubes of a tube frame for use in carpet and like looms, the combination with a series or bank of thread-placing devices, of means for holding the yarn, including a transfer comb and a spool, means for causing the thread placing devices to engage the tuft yarns and place them through the tubes by a relative movement between the tubes and said devices, and means for effecting a movement of the transfer comb to untension the yarns, after the yarns have been engaged by the thread placing devices and prior to their having been threaded through the tubes.

18. In a machine for threading the tuft yarns through the tubes of a tube frame for use in carpet and like looms, the combination with a series or bank of thread placing devices, of means for causing them simultaneously to place the tuft yarns through the tubes by relative movement between the tubes and said devices, means for holding the yarns, and means apart from the relative threading movement between the tubes and said devices for relaxing the yarns to assist in their being placed through the tubes.

19. In a machine for threading tuft yarns through the tubes of a tube frame, the combination of a frame holder, a series of thread placing devices, means for holding the yarns including a comb element and a spool element, means for engaging the yarns by the thread placing devices and moving the latter through the tubes, and means for moving one of said yarn holding elements after the thread placing devices have engaged the yarns and started on their thread placing movement, but prior to the placing of the yarns through the tubes, said movement being in a direction to untension or loosen the yarns.

In testimony whereof, we have signed our names to this specification, in the presence of two subscribing witnesses.

EDGAR F. HATHAWAY.
CHARLES LEA.

Witnesses:
EVERETT S. EMERY,
THOMAS B. BOOTH.